United States Patent
Hochmuth et al.

(10) Patent No.: US 8,443,093 B2
(45) Date of Patent: May 14, 2013

(54) CONNECTION MANAGEMENT SYSTEM FOR MULTIPLE CONNECTIONS

(75) Inventors: Roland M. Hochmuth, Fort Collins, CO (US); Byron A. Alcorn, Fort Collins, CO (US); Jeffrey Joel Walls, Fort Collins, CO (US); Thomas J. Flynn, Magnolia, TX (US); Quoc P. Pham, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 224 days.

(21) Appl. No.: 12/236,664

(22) Filed: Sep. 24, 2008

(65) Prior Publication Data
US 2009/0327503 A1 Dec. 31, 2009

Related U.S. Application Data

(60) Provisional application No. 61/075,392, filed on Jun. 25, 2008.

(51) Int. Cl.
*G06F 15/173* (2006.01)
(52) U.S. Cl.
USPC .............................................. 709/229; 718/1
(58) Field of Classification Search ........................ None
See application file for complete search history.

(56) References Cited

U.S. PATENT DOCUMENTS

| 8,141,075 | B1* | 3/2012 | Chawla et al. ..................... 718/1 |
| 8,335,703 | B1* | 12/2012 | Pulier et al. .................. 705/7.11 |
| 2006/0075106 | A1* | 4/2006 | Hochmuth et al. ........... 709/227 |
| 2006/0167674 | A1* | 7/2006 | Loisey et al. .................... 703/21 |
| 2007/0171921 | A1* | 7/2007 | Wookey et al. ............... 370/401 |
| 2007/0174410 | A1* | 7/2007 | Croft et al. ..................... 709/208 |
| 2008/0235361 | A1* | 9/2008 | Crosbie et al. ................ 709/223 |
| 2009/0006537 | A1* | 1/2009 | Palekar et al. ................ 709/203 |
| 2009/0043840 | A1* | 2/2009 | Cherukuri et al. ............ 709/203 |
| 2009/0094365 | A1* | 4/2009 | Orady et al. .................. 709/226 |

* cited by examiner

*Primary Examiner* — Ario Etienne
*Assistant Examiner* — Clayton R Williams (57) ABSTRACT

In one embodiment a computing system comprises one or more processors, a display device coupled to the computing system, a connection client module, at least one remote access client module, a memory module communicatively connected to the one or more processors and comprising logic to; receive a service request from a user via a remote connection client coupled to the connection server, wherein the service request comprises at least one user credential, authenticate the at least one user credential, retrieve at least one user profile associated with the user, connection data for at least one remote system and at least one policy associated with the at least one user profile, transmit the at least one user profile, at least one remote system and the connection data for at least one remote system and at least one policy associated with the at least one user profile from the connection server to the remote connection client.

10 Claims, 5 Drawing Sheets

Connection Management System for Multiple Connections

505 — Users Table

| UserId | Username | GroupId |
|---|---|---|
| 1 | Joe | 1 |
| 2 | Sally | 2 |

510 — Profile to User Table

| UsertoProfileId | UserId | ProfileId |
|---|---|---|
| 1 | 1 | 1 |
| 2 | 1 | 2 |
| 3 | 2 | 3 |

515 — Profiles Table

| ProfileId | ProfileName |
|---|---|
| 1 | High |
| 2 | Low |
| 3 | Medium |

520 — System to Profile Table

| SystemToProfileId | SystemId | ProfileId | PolicyId |
|---|---|---|---|
| 1 | 1 | 1 | 1 |
| 2 | 2 | 1 | 2 |

525 — Pool to Profile Table

| PoolToProfileId | PoolId | ProfileId | PolicyId |
|---|---|---|---|
| 1 | 1 | 2 | 1 |
| 2 | 2 | 2 | 2 |
| 3 | 2 | 3 | 1 |
| 3 | 2 | 3 | 2 |

530 — Systems Table

| SystemId | HostName |
|---|---|
| 1 | Blade1 |
| 2 | Blade2 |
| 3 | Blade3 |
| 4 | Blade4 |
| 5 | Blade5 |
| 6 | Blade6 |

535 — Pools Table

| PoolId | PoolName |
|---|---|
| 1 | PoolA |
| 2 | PoolB |

540 — Pool to Systems Table

| PooltoSystemsId | PoolId | SystemId |
|---|---|---|
| 1 | 1 | 3 |
| 2 | 1 | 4 |
| 3 | 2 | 5 |
| 4 | 2 | 6 |

545 — Policies Table

| PolicyId | x | y | width | height | IsUsEnabled |
|---|---|---|---|---|---|
| 1 | 0 | 0 | 1280 | 1024 | true |
| 2 | 1280 | 0 | 1280 | 1024 | true |
| 3 | 0 | 0 | 1280 | 1024 | true |

CONNECTION MANAGEMENT SYSTEM FOR MULTIPLE CONNECTIONS

CROSS-REFERENCE TO RELATED APPLICATIONS

This application claims the benefit of U.S. Provisional Application Ser. No. 61/075,392, filed Jun. 25, 2008, titled "Connection Management System For Multiple Connections" which is hereby incorporated by reference herein as if reproduced in full below.

BACKGROUND

Connection management systems may comprise client/server applications that connect a user to a single remote system. A connection management system that allows for more flexibility in the number of remote systems a user can connect to would find utility.

DETAILED DESCRIPTION

Described herein are exemplary systems and methods which may be used to implement multiple connections through a connection management system. In the following description, numerous specific details are set forth in order to provide a thorough understanding of various embodiments. However, it will be understood by those skilled in the art that the various embodiments may be practiced without the specific details. In other instances, well-known methods, procedures, components, and circuits have not been described in detail so as not to obscure the particular embodiments.

Figure 1:
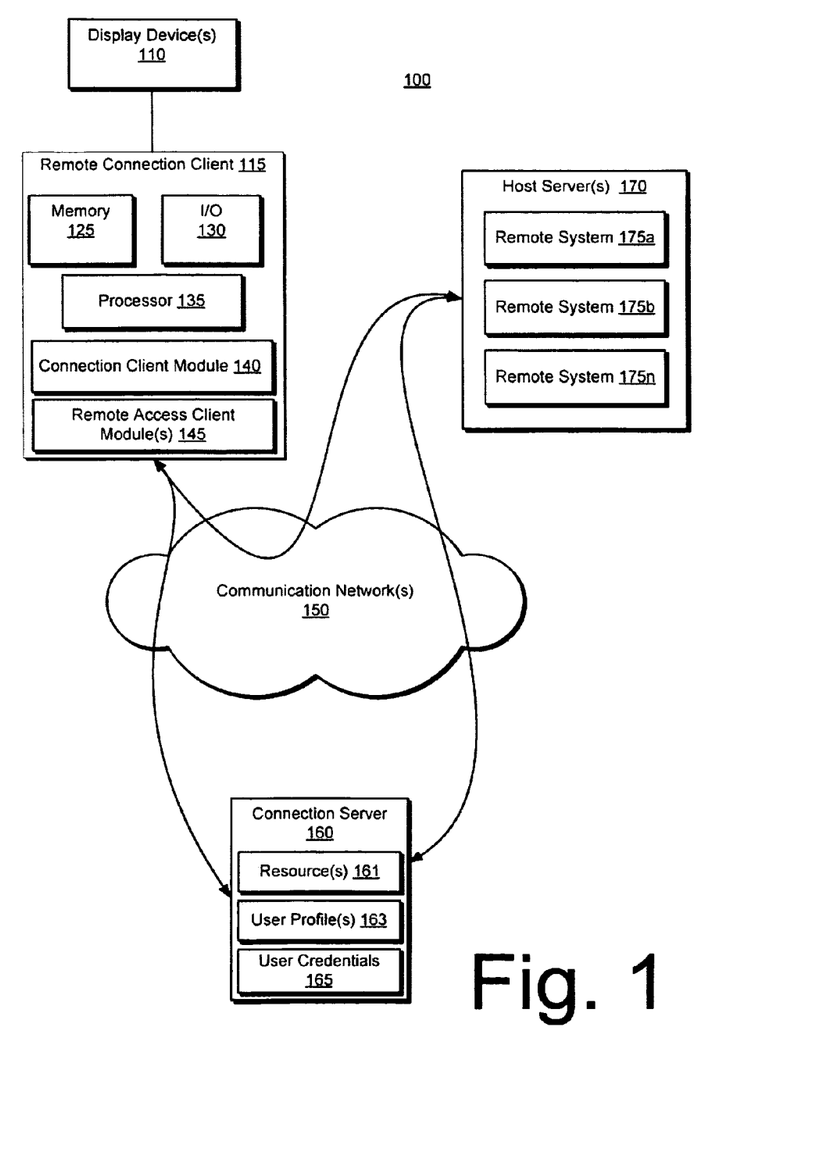
FIG. 1 is a schematic illustration of a connection management system computing environment in which multiple connections may be implemented, according to embodiments.

FIG. 1 is a schematic illustration of connection management system computing environment 100 in which multiple connections may be implemented, according to embodiments. The networked computing environment 100 is intended to illustrate a client-server network configuration, and may represent a computing environment that spans a corporate or college campus, a city, or an entire geographic region.

Computing environment 100 comprises a remote connection client 115, a connection server 160, and at least one host server 170 communicatively coupled by at least one communication network 150. In the embodiment depicted in FIG. 1, connection server 160 comprises resources 161 such as, e.g., applications, storage, or other resources. In some embodiments, connection server 160 may comprise at least one user profile 163, and at least one user credentials 165. By way of example and not limitation, a user profile 163 is presented in FIG. 5 and discussed in more depth below. Servers 160 and 170 need not be centrally located. Servers 160 and 170 may be physically remote from one another and maintained separately.

In some embodiments, a remote connection client 115 may comprise; a memory module 125, an input/output module 130, a processor 135, a connection client module 140, and a remote access client module 145. Furthermore, the remote connection client 115 may be coupled to at least one display device 110. At least one remote connection client 115 may communicate with connection server 160 via a communication network 150. Each remote connection client 115 in the computing environment 100 may be implemented as a fully functional client computer; or as a thin client computing device as depicted in FIG. 1.

Thin client computing devices have become more popular among IT organizations. Compared to fully functional client computers, thin client computing devices may have only a relatively small amount of system memory 125 and a relatively slow processor 135. In some embodiments, the processor 135 may be a graphics processor. Thin clients provide several advantages over fully functional client computers. For example, thin clients may be more reliable than their fully functional client computers, which in turn may reduce maintenance costs.

The number of remote connection clients 115 may be related to the computing power of the servers 160, 170. If the servers have a high degree of computing power (for example, fast processor(s) and/or a large amount of system memory) then they will be able to effectively serve a relatively large number of client computers.

In some embodiments, a connection client module 140 may comprise software to run on a remote connection client 115. The connection client module 140 may communicate with a connection server 160 and receive a list of remote systems 175a, 175b . . . 175n with which the remote connection client 115 may connect. Furthermore, a connection client module 140 may create connections with the remote systems 175a, 175b . . . 175n by controlling various remote access client modules 145.

In some embodiments, a remote access client module 145 may comprise software to run on a remote connection client 115. The remote access client module 145 may allow a computing system to communicate with a remote system by managing connection properties and parameters.

Remote connection client 115 and servers 160 and 170 are connected to a communication network 150. These connections may be implemented as a Personal Area Network (PAN), Local Area Network (LAN), Metropolitan Area Network (MAN), a Wide Area Network (WAN) or the like. Furthermore, communication network 150 may comprise one or more sub-networks. By way of example, and not by limitation, communication network 150 may comprise one or more wireless access points (WAPs) that establish a wireless network, which is coupled to a LAN or directly to a backbone network such as the Internet. Additionally, the communication network 150 may include a variety of input/output transports such as, but not limited to wired USB or serial links, Wireless 802.11x link, wireless USB, Blue-tooth, infra red link or the like.

In some embodiments, connection server 160 may contain among other resources, at least one user profile 163 and at least one user credentials 165. By way of example and not limitation, a user profile is presented in FIG. 5 and is discussed in more depth below.

In some embodiments, a host server 170 may comprise at least one remote system 175a, 175b . . . 175n. In some embodiments, the remote systems 175a, 175b ... 175n may comprise blades coupled to the host server 170.

In operation, a user may elect to connect via the client connection module 140 to one or more remote systems 175a, 175b ... 175n. The connection client module 140 may prompt the user for their username/credentials. The connection client module 140 may send a request to the connection server 160 along with the user's credentials. The connection server 160 may determine if the user has one or more profiles 163. If the user has one profile 163, the connection server 160 may determine the remote systems 175a, 175b ... 175n that the user can connect to and the properties/policies that should be used for each connection. If systems are dynamically assigned an available remote system may be determined out of a pool of remote systems 175a, 175b ... 175n. If remote systems 175a, 175b ... 175n are statically assigned to a user, those remote systems 175a, 175b ... 175n may be returned. The properties also may include information on what remote access client module 145 to use for each connection and potentially the window position, width, and height for each connection as well as any other properties/settings that can be specified in the remote access client, such as "IsUsbEnabled". The connection server 160 may send this information back to the connection client module 140. The connection client module 140 may then start up the specified remote access client modules 145 and initiate connections to each remote system using the supplied properties.

By way of example and not limitation, the above discussed remote connection client 115 may allow a user to connect to multiple remote systems contemporaneously and may allow the simultaneous use of multiple remote access modules 145. Furthermore, properties for each connection may be individually applied for each connection. In some embodiments, a connection may be routed through a connection server 160. In some embodiments, a connection between a remote system and computing system may be established across a communication network 150.

Figure 2:
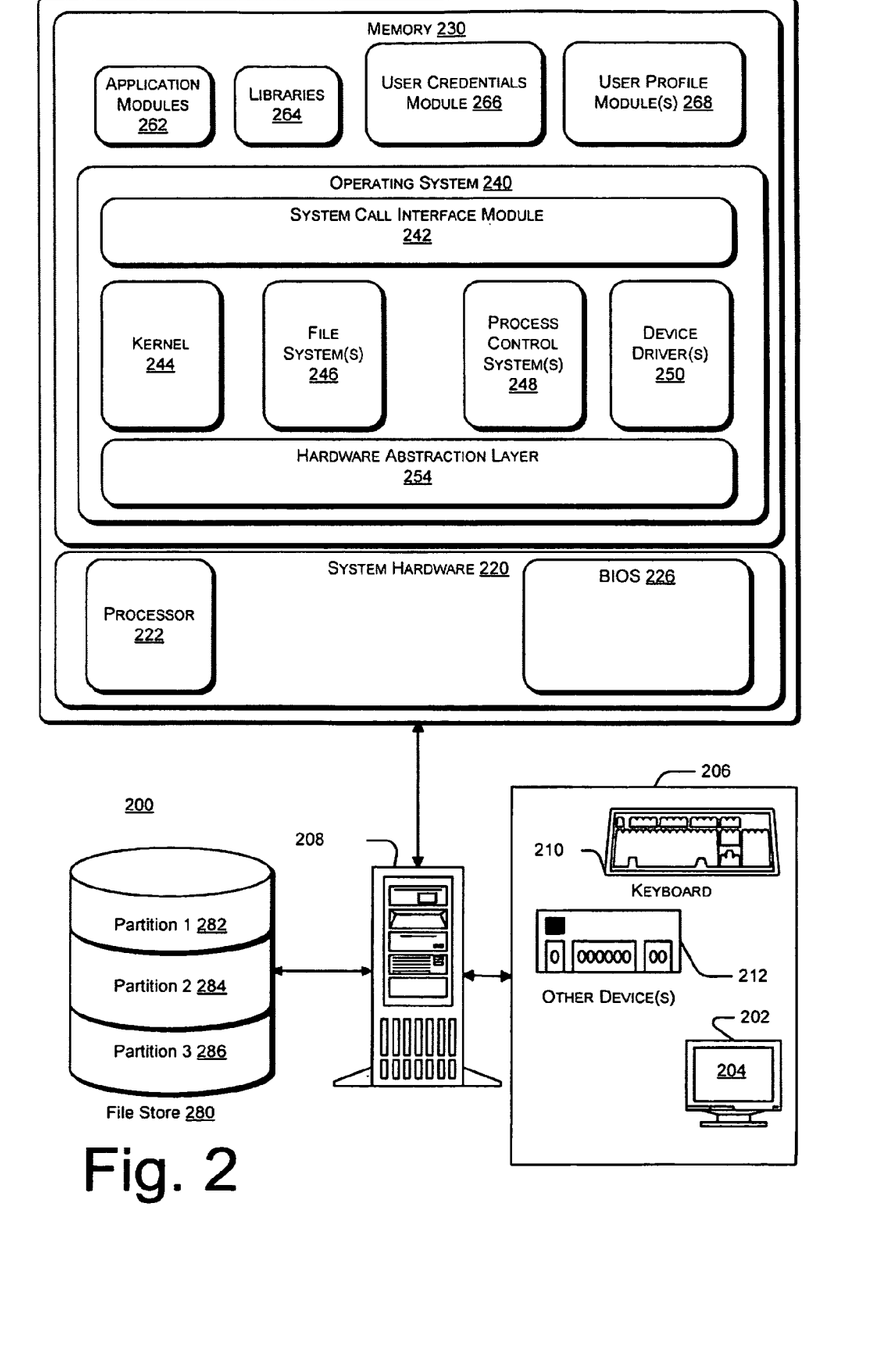
FIG. 2 is a schematic illustration of a connection server, according to embodiments.

FIG. 2 is a schematic illustration of a connection server 200 adapted to implement multiple connections through a connection management system, according to embodiments. The connection sever 200 includes a computing engine 208 and possibly one or more accompanying input/output devices 206 including, but not limited to, a display 202 having a screen 204, a keyboard 210, and other I/O device(s) 212. The other device(s) 212 may, by way of example, and not by limitation, include a touch screen, a voice-activated input device, a track ball, a mouse and any other device that allows the connection server 200 to receive input from a developer and/or a user.

The computing engine 208 includes system hardware 220 commonly implemented on a motherboard and at least one auxiliary circuit board. System hardware 220 includes a processor 222 and a basic input/output system (BIOS) 226. BIOS 226 may be implemented in flash memory and may comprise logic operations to boot the computing engine 208 and a power-on self-test (POST) module for performing system initialization and tests. In operation, when activation of computing engine 208 begins processor 222 accesses BIOS 226 and shadows the instructions of BIOS 226, such as power-on self-test module, into operating memory. Processor 222 then executes power-on self-test operations to implement POST processing.

Connection server 200 further includes a file store 280 communicatively connected to computing engine 208. File store 280 may be internal such as, e.g., one or more hard drives, or external such as, e.g., one or more external hard drives, network attached storage, or a separate storage network. In some embodiments, the file store 280 may include one or more partitions 282, 284, 286.

Memory 230 includes an operating system 240 for managing operations of computing engine 208. In one embodiment, operating system 240 includes a hardware abstraction layer 254 that provides an interface to system hardware 220. In addition, operating system 240 includes a kernel 244, one or more file systems 246 that manage files used in the operation of computing engine 208 and a process control subsystem 248 that manages processes executing on computing engine 208. Operating system 240 further includes one or more device drivers 250 and a system call interface module 242 that provides an interface between the operating system 240 and one or more application modules 262 and/or libraries 264. The various device drivers 250 interface with and generally control the hardware installed in the computing system 200.

In operation, one or more application modules 262 and/or libraries 264 executing on computing engine 208 make calls to the system call interface module 242 to execute one or more commands on the computer's processor. The system call interface module 242 invokes the services of the file systems 246 to manage the files required by the command(s) and the process control subsystem 248 to manage the process required by the command(s). The file system(s) 246 and the process control subsystem(s) 248, in turn, invoke the services of the hardware abstraction layer 254 to interface with the system hardware 220. The operating system kernel 244 can be generally considered as one or more software modules that are responsible for performing many operating system functions.

The particular embodiment of operating system 240 is not critical to the subject matter described herein. Operating system 240 may, for example, be embodied as a UNIX operating system or any derivative thereof (e.g., Linux, Solaris, etc.) or as a Windows® brand operating system or another operating system.

In some embodiments, connection server 200 may comprise at least one user credentials module 266 and at least one user profile module 268, which may comprise operational logic and may include or invoke hardware that can communicate with at least one remote device. In the embodiment depicted in FIG. 2, system memory 230 includes at least one user credentials module 266 and at least one user profile module 268. By way of example and not limitation, a user profile is presented in FIG. 5 and is discussed in more depth below. Operations implemented using the user credentials module 266 and user profile module 268 will be discussed in greater detail below, with reference to FIGS. 3 and 4.

In operation, a user on a remote connection client 115 may connect to a connection server 200. The user may provide credentials to authorize access to remote systems. These credentials may be checked against user credentials module 266 to determine if the user may be granted access. Once a user has been authorized, a user may select from at least one user profile 268 stored on the connection server. An example user profile is profiled in FIG. 5 and further discussed below. Once a user has selected a user profile, the connection server 200 may send connection data to the user remote connection client 115. This connection data may allow the remote connection client 115 to access at least one remote system 175. In some embodiments, remote systems 175 may be blades in a host server 170.

Figure 3:
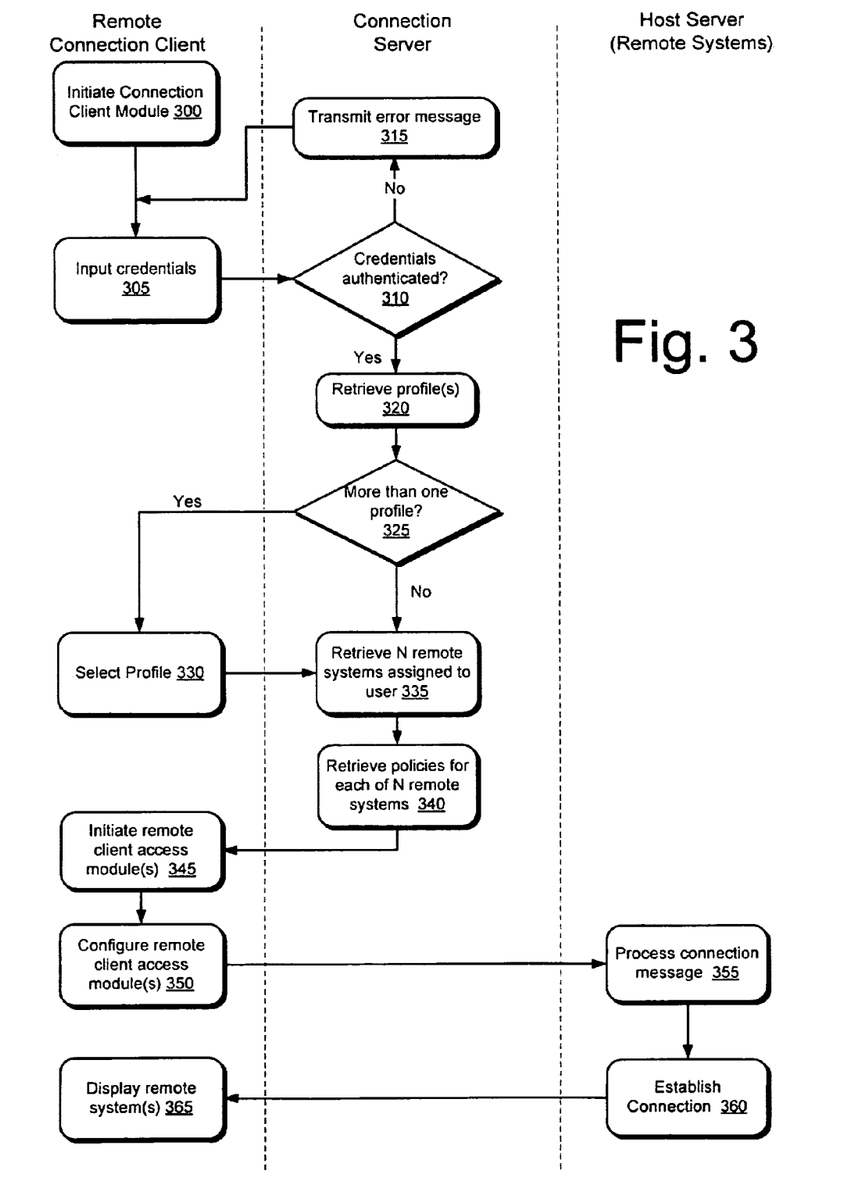
FIG. 3 is a flowchart illustrating operations implementing multiple connections through a connection management system, according to embodiments.

FIG. 3 is a flowchart illustrating operations implementing multiple connections through a connection management system, according to embodiments. Referring to FIG. 3, at operation 300 a connection client module is initiated. In some embodiments, a connection client module 140 may run as software on a user computing system, such as a remote connection client 115 depicted in FIG. 1. In some embodiments, a user may initiate the connection client module 140. In some embodiments, the connection client module 140 may be initiated automatically during the computing device start up or the like. At operation 305, a user may input credentials. In some embodiments, the user credentials may be used to determine whether a user may gain access to remote systems. Once the user credentials have been inputted, the credentials are transmitted to a connection server, such as the connection server 160 depicted in FIG. 1.

At operation 310, a connection server 160 authenticates the inputted user credentials. If at operation 310, the user credentials are insufficient, at operation 315 an error message is transmitted to inform the user that access has not been granted. By contrast, if at operation 310 the user credentials are sufficient then at connection, the connection server retrieves at least one user profile at operation 320.

If at operation 325, the connection server 160 has retrieved more than one user profile then a list of the retrieved user profiles is transmitted to the remote connection client 115. At operation 330, a user profile is selected and transmitted to the connection server 160.

By contrast, if at operation 325, the connection server 160 retrieves only one profile, then the connection server 160 retrieves connection data for the known number of remote systems assigned to the retrieved user profile at operation 335. In some embodiments, if a user has not created or been assigned a specific profile, a default profile may be transmitted to the computing device. An example of information stored in a user profile is presented in FIG. 5 and is discussed below.

At operation 335, the number of remote systems assigned to the user is determined. In some embodiments, remote systems may be statically assigned, while in other embodiments remote systems may be dynamically assigned. If systems are dynamically assigned at least one available remote system may be determined out of a pool of remote systems. If remote systems are statically assigned to a user, those remote systems may be returned.

At operation 340, the policies of at least one remote system are determined. Policies also may include information on what remote access client module to use for each connection and potentially the window position, width, and height for each connection as well as any other properties/settings that can be specified in the remote access client, such as "IsUsbEnabled". The number of available remote systems and their associated policies are communicated to the remote connection client 115.

At operation 345, at least one remote client access module is initiated. In some embodiments, different remote systems may use different remote client access modules.

At operation 350, remote client access module configures the remote connection client 115 to connect to at least one remote system. In some embodiments, the connection client module may start up the specified remote access client modules and initiate connections to each remote system using the supplied properties and policies.

At operation 355, at least one remote system receives connection data from at least one remote access client module. In some embodiments, the connection data may be transmitted through a connection server. In some embodiments, a connection between a remote system and computing system may be established across a communication network. At operation 360, a connection is established with at least one remote system.

At operation 365, at least one remote system is displayed on a user computing system by the remote access client. In some embodiments, the user profile determines display characteristics and the like for the remote system of the user computing device. An example of information contained in a user profile is presented in FIG. 5 and is discussed further below.

Figure 4:
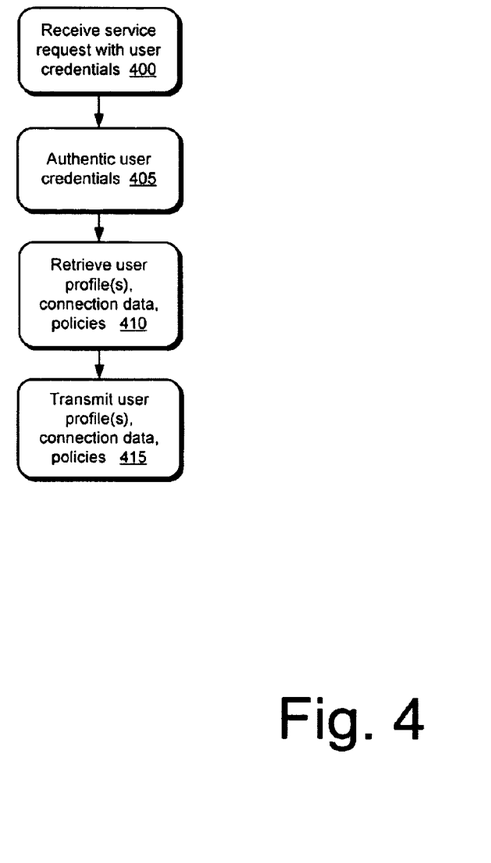
FIG. 4 is a flowchart illustrating operations implementing multiple connections through a connection management system, according to embodiments.

FIG. 4 is a flowchart illustrating operations implementing multiple connections through a connection server, according to embodiments. Referring to FIG. 4, at operation 400, a service request is received accompanied by user credentials. In some embodiments, user credentials are received from a computing device and have been inputted by a user. In operation, user credentials may include a user identifier, a user name or the like.

At operation 405 user credentials are authenticated. In some embodiments, a connection server may store a list or the like of user credentials for comparison with the inputted user credentials. In some embodiments, authentication of user credentials may be performed by transmitting the information to a host server or the like.

At operation 410, once the user credentials have been authenticated, the connection server may retrieve at least one user profile associated with the user, connection data for at least one remote system and at least one policy associated with the at least one user profile. An example of information stored in a user profile is presented in FIG. 5 and is discussed below. In some embodiments, if the user has only one profile, the connection server may determine the remote systems that the user may connect to and the properties/policies that should be used for each connection.

At operation 415, a connection server may transmit at least one remote system and the connection data for at least one remote system and at least one policy associated with the at least one user profile from the connection server to a remote connection client. In some embodiments, remote systems may be statically assigned, while in other embodiments remote systems may be dynamically assigned. If systems are dynamically assigned at least one available remote system may be determined out of a pool of remote systems. If remote systems are statically assigned to a user, those remote systems may be returned. The policies also may include information on what remote access client module to use for each connection and potentially the window position, width, and height for each connection.

Figure 5:
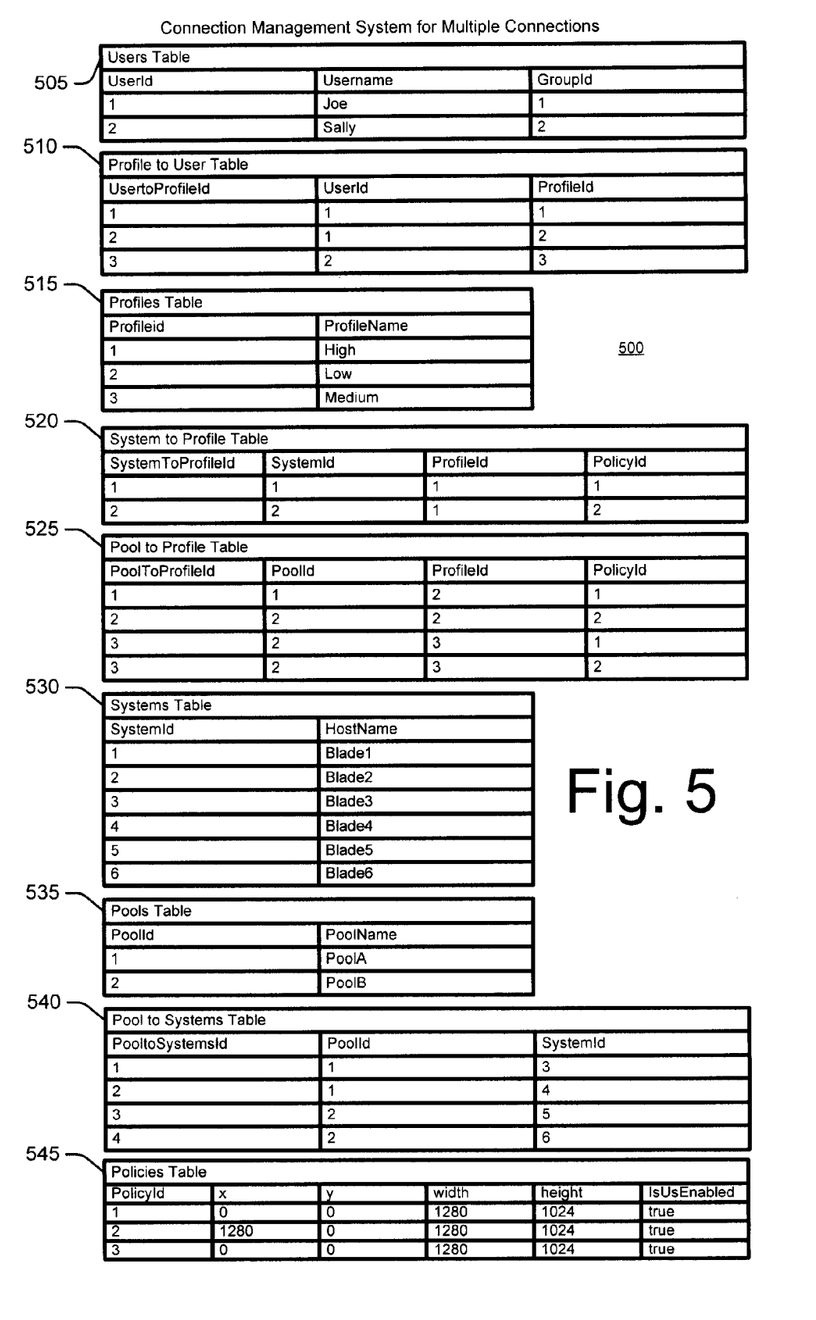
FIG. 5 is a schematic illustration of a user profile for implementing multiple connections through a connection management system, according to embodiments.

FIG. 5 is a schematic illustration of data contained in a user profile for implementing multiple connections through a connection management system, according to embodiments. A user profile 500, may comprises multiple tables, such as but not limited to; User Table 505, Profile to User Table 510, Profiles Table 515, System to Profile Table 520, Pool to Profile Table 525, Systems Table 530, Pools Table 535, Pool to Systems Table 540, and Policies Table 545. The user profile depicted in FIG. 5 is meant as an illustration of a data organization structure and is not intended to limit the scope of the subject matter described and claimed herein.

Referring to FIG. 5, in the depicted example User=Joe in the Users Table 505 is assigned to profiles ProfileId=1 and ProfileId=2 in the Profile to User Table 510. If ProfileId=1 is selected by the user from the connection client module 140 by Joe, the connection server 160 will determine that two systems are assigned to ProfileId=1 from the System to Profile Table 520, which are Blade1 and Blade2, as shown in the Systems Table 530. If ProfileId=2 is selected from the connection client module 140 by Joe, the connection server 160 will determine that Joe will get two systems, one from PoolId=1 and the other from PoolId=2. If PoolId=1 there are two systems available with SystemId=3 and SystemId=4, as shown in the Pools to Systems Table 540, which correspond to Blade3 and Blade4 in the Systems Table 530. If PoolId=2 there are two systems available with SystemId=5 and SystemId=6, as shown in the Pools to Systems Table 540. So the connection server 160 may select one system from Blade3 and Blade4 and another system from Blade5 and Blade6.

The policies that may be applied to these systems are PolicyId=1 and PolicyId2 for the first and second system respectively. As depicted in FIG. 5, if Joe has a client system that has two displays connected, both with a resolution 1280× 1024 and organized in a left to right layout, the desktop for the first system will be displayed by the remote access client on the left display, based on the settings for PolicyId=1 and the desktop for the second system will be displayed on the right display based on the settings for PolicyId=2.

By way of example and not limitation, additional detail will now be provided with regards to possible formats and information associated with user profiles, properties and policies. In some embodiments, the connection client module 160, may allow multiple sessions to connect to a single client computing device; sessions to be statically assigned as individual blades or roles; and, users to request additional resources or reconnect to existing resources.

In some embodiments, administrators may statically assign both blades and roles to a user. In the case of an assigned role, a blade resource from that role is assigned to the user when they connect using the connection client. The term "on-demand resources" may be implied to be those statically assigned resources not assigned to a specific client a user is logged into and all dynamic resources to which the user may have access. These on-demand resources will not be explicitly identified in the connection server management page. A global property may be added to allow unknown client computing devices to immediately connect to all statically assigned blades and private roles. If public roles are available the user may only be able to connect when the connection choice dialog is visible. Unknown client computing devices, i.e. those that are unmanaged, will follow standard policy management. If a user chooses resolution, or full screen, then all resources may be forced to match this. Furthermore, a server can override user's choice. Borders may be enabled or disabled by a user on connection client or may be over-ridden by the administrator.

A connection choice dialog may allow a user to select one or more resources with which to connect. Furthermore, a connection choice dialog may allow a user to connect to any statically assigned blades not assigned to the specific client computing device they are using or any dynamic roles that they may be allowed to use. Additionally, a connection choice dialog may not show any choices for resources currently enabled (in the connection dialog status pane) on the client computing device through the connection client module.

A connection status dialog may allow a user to change the connection status of one or more sessions and to determine connection status dialog behavior. The connection status dialog may include a Session number, Friendly name or role, and a Status such as connecting, connected, disconnected, failed, or unavailable. The status dialog may also allow a user to change the connection status of one or more sessions may include options such as selecting one or more blades or role to disconnect, disconnecting all sessions, selecting one or more blade or role to re-connect, reconnecting all sessions, adding a new connection (default is to have button disabled), enabled through a configuration file, and if a resource with a different connection status is chosen non-compatible blades may be deselected. For example if a connected blade is selected followed by selecting a disconnected blade then the first connected blade will be deselected. In some embodiments, determining the connection status dialog behavior may include a mouse crossing the hot-edge of the client display, wherein the hot-edge is programmable and can be the top, bottom, left, or right of the client display, the dialog can be centered on the virtual screen or centered on the current mouse position. These behaviors can be set in a Timer tab (which may move depending on feedback) of the connection client. The connection status dialog may also be started if an attempt is made to start a second client, the second client then exits, and any new resources added will show up in the connection status dialog status.

In some embodiments, only those sessions required by a second client will be disconnected from the first client. Additionally, the connection status dialog may presented on the client computing device where a session is lost due to roaming. A timer may close the dialog after a configurable number of seconds. Furthermore, the connection manager may not attempt to manage connections started outside of the connection client, even if the connections were made from the same client. Connections started outside of connection manager will close, if the resources are requested by the connection client.

If a user transitions to a failover blade the following behavior will be observed: As long as the user is logged into the blade he will continue to use the failover even if the primary blade is available. The connection manager server sends the failover blade back to the client until the user logs out. Furthermore, if a logout of the failover blade occurs, then the connection manager server should choose the primary blade if it's available. Connection policies that are set before the first session starts will apply the same policies to all sessions regardless of when they are started. To change parameters users may disconnect from all active sessions.

Thus, described herein are exemplary system and methods for implementing multiple connections through a connection management system. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method for remote connection management with multiple systems, the method comprising:
   receiving, in a connection server, a service request from a user via a remote connection client coupled to the connection server, wherein the service request comprises at least one user credential;
   authenticating, in the connection server, the at least one user credential;
   retrieving, in the connection server, a list of at least two user profiles;
   transmitting the list of at least two user profiles to the remote connection client;

receiving a selection signal from the remote connection client, wherein the selection signal identifies a selected user profile that the user wishes to use;
dynamically assigning to the user a remote system from a pool of available remote systems based on the selection signal;
retrieving, in the connection server, connection data for the remote system and at least one policy associated with the selected user profile, wherein the at least one policy determines a display characteristic for the remote system on a computing device of the user; and
transmitting the selected user profile, the connection data for the remote system and the at least one policy associated with the least one selected user profile from the connection server to the remote connection client.

2. The method of claim 1, wherein the service request is initiated in the remote connection client by:
initiating a connection client module associated with the computing device of the user;
prompting, via the connection client module, the user to input the at least one user credential at the computing device; and
transmitting, from the computing device, the at least one user credential to the connection server, wherein the selected user profile, retrieved in the connection server, comprises a data organization structure relating the user to the at least one remote system and the at least one policy.

3. The method of claim 1, comprising:
receiving, in the remote connection client, the selected user profile, the connection data for the remote system and the at least one policy associated with the selected user profile
initiating, in the remote connection client, a session for the remote system;
establishing a connection between the remote connection client and the remote system; and
displaying a remote desktop at the computing device of the user for the remote system, wherein the display characteristic determined by the at least one policy associated with the selected user profile comprises a window position, a window width, or a window height, or any combination thereof.

4. The method of claim 3, further comprising:
initiating, in the remote connection client, a session for a second remote system;
establishing a connection between the remote connection client and the second remote system, wherein establishing comprises statically assigning the connection between the remote connection client and the second remote system; and
displaying a remote desktop at the computing device of the user for the second remote system.

5. A remote connection client comprising a computing system comprising:
one or more processors;
at least one display device;
a connection client module;
at least one remote access client module;
a memory communicatively coupled to the one or more processors and comprising logic to:
initiate the connection client module;
prompt a user to input at least one user credential at the remote connection client;
transmit a service request from the user via the remote connection client to a connection server coupled to the remote connection client, wherein the service request comprises the at least one user credential, wherein the at least one user credential is authenticated at the connection server;
receive a list of at least two user profiles associated with the user from the connection server;
send a selection signal from the remote connection client to the connection server, wherein the selection signal identifies a selected user profile that the user wishes to use, and wherein the connection server dynamically assigns to the user a remote system from a pool of available remote systems based on the selection signal; and
receive the selected user profile, connection data for the remote system and at least one policy associated with the selected user profile from the connection server, wherein the at least one policy comprises a display characteristic for the remote system on the at least one display device.

6. The computing system of claim 5, wherein the logic to receive the selected user profile, the connection data for at least one remote system and the at least one policy associated with the at least one user profile, comprises logic to:
initiate a session for the remote system;
establish a connection between the remote connection client and the remote system; and
display a remote desktop of the remote system on the at least one display device, wherein the display characteristic comprises a window position, a window width, or a window height, or any combination thereof.

7. The computing system of claim 6, further logic to:
initiate a session for a second remote system;
establish a connection between the remote connection client and the second remote system; and
display a remote desktop on the at least one display device for the second remote system.

8. A non-transitory computer program product comprising logic instructions stored on a computer-readable medium which, when executed by a computer processor, configures the computer processor to:
receive a service request from a user via a remote connection client coupled to a connection server, wherein the service request comprises at least one user credential;
authenticate the at least one user credential;
retrieve a list of at least two user profiles associated with the user;
transmit the list of at least two user profiles to the remote connection client;
receive a selection signal from the remote connection client, wherein the selection signal identifies a selected user profile that the user wishes to use;
dynamically assign to the user a remote system from a pool of available remote systems based on the selection signal;
retrieve connection data for the remote system and at least one policy associated with the selected user profile, wherein the at least one policy comprises a display characteristic for the remote system as displayed at the remote connection client;
transmit the selected user profile, the connection data for the remote system and the at least one policy associated with the selected user profile from the connection server to the remote connection client.

9. The non-transitory computer program product of claim 8, further comprising logic instructions which, when executed on the processor, configures the processor to:
initiate a connection client module;
prompt the user to input the at least one user credential;
receive the at least one user credential; and transmit, from the computing device, the at least one user credential to the connection server.

10. The non-transitory computer program product of claim 8, further comprising logic instructions which, when executed on the processor, configures the processor to:
receive the selected user profile, the connection data for the remote system and the at least one policy associated with the selected user profile;
initiate a session for the remote system;
establish a connection between the remote connection client and the remote system; and
display a remote desktop of the remote system at the remote connection client, wherein the display characteristic comprises at least one of a window position, a window width, or a window height.

* * * * *

UNITED STATES PATENT AND TRADEMARK OFFICE
CERTIFICATE OF CORRECTION

PATENT NO. : 8,443,093 B2  
APPLICATION NO. : 12/236664  
DATED : May 14, 2013  
INVENTOR(S) : Roland M. Hochmuth et al.

Page 1 of 1

It is certified that error appears in the above-identified patent and that said Letters Patent is hereby corrected as shown below:

In the Claims:

In column 9, line 14, in Claim 1, before "selected" delete "least one".

Signed and Sealed this  
Tenth Day of September, 2013

Teresa Stanek Rea  
*Acting Director of the United States Patent and Trademark Office*